Figure 1:
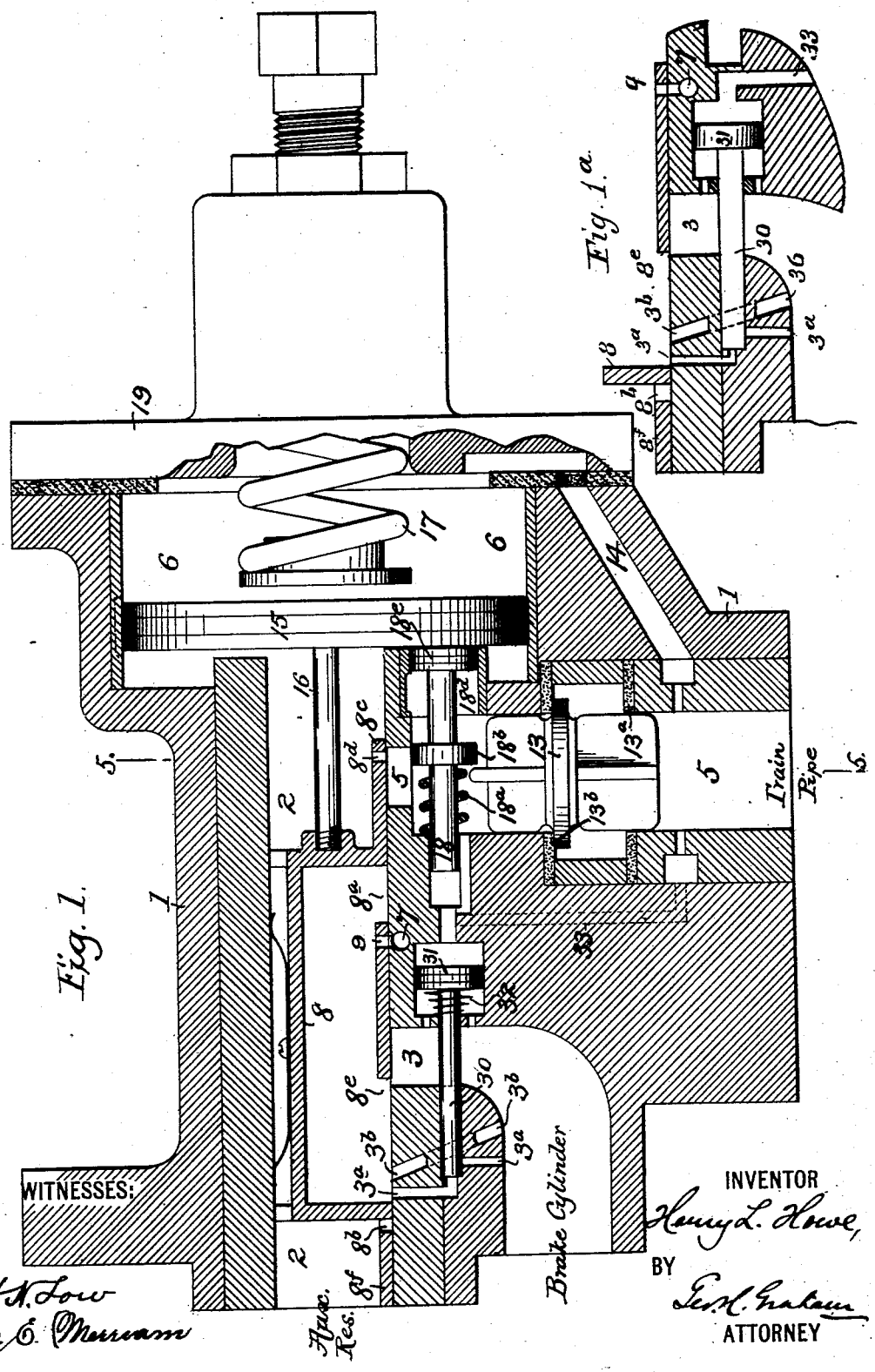

(No Model.) 6 Sheets—Sheet 1.
H. L. HOWE.
TRIPLE VALVE FOR AIR BRAKES.
No. 568,979. Patented Oct. 6, 1896.

WITNESSES:
H. N. Low
C. E. Merriam

INVENTOR
Harry L. Howe,
BY
Geo. H. Graham
ATTORNEY (No Model.)  6 Sheets—Sheet 2.

H. L. HOWE.
TRIPLE VALVE FOR AIR BRAKES.

No. 568,979. Patented Oct. 6, 1896.

WITNESSES:
H. N. Low
C. E. Merriam

INVENTOR
Henry L. Howe
BY
Geo. H. Graham
ATTORNEY (No Model.) 6 Sheets—Sheet 3.
H. L. HOWE.
TRIPLE VALVE FOR AIR BRAKES.

No. 568,979. Patented Oct. 6, 1896.

WITNESSES:
H. N. Low
C. E. Merriam

INVENTOR
Henry L. Howe
BY
Geo. C. Graham
ATTORNEY (No Model.) 6 Sheets—Sheet 4.

H. L. HOWE.
TRIPLE VALVE FOR AIR BRAKES.

No. 568,979. Patented Oct. 6, 1896.

(No Model.) 6 Sheets—Sheet 5.

H. L. HOWE.
TRIPLE VALVE FOR AIR BRAKES.

No. 568,979. Patented Oct. 6, 1896.

Witnesses
Jas H Blackwood
H. N. Low

Inventor
Henry L. Howe
by Jas. Graham
Attorney (No Model.)

H. L. HOWE.
TRIPLE VALVE FOR AIR BRAKES.

No. 568,979.

6 Sheets—Sheet 6.

Patented Oct. 6, 1896.

Witnesses
Jos H Blackwood
H. N. Low

Inventor
Henry L. Howe
by Jus. L. Graham
Attorney

THE NORRIS PETERS CO., PHOTO-LITHO., WASHINGTON, D. C.

UNITED STATES PATENT OFFICE.

HENRY L. HOWE, OF CANANDAIGUA, NEW YORK, ASSIGNOR TO THE STANDARD BRAKE COMPANY, OF NEW YORK, N. Y.

TRIPLE VALVE FOR AIR-BRAKES.

SPECIFICATION forming part of Letters Patent No. 568,979, dated October 6, 1896.

Application filed May 3, 1893. Serial No. 472,872. (No model.)

*To all whom it may concern:*

Be it known that I, HENRY L. HOWE, a citizen of the United States of America, residing at Canandaigua, Ontario county, State of New York, have invented certain new and useful Improvements in Triple Valves for Air-Brakes, of which the following is a specification.

This invention relates generally to fluid-pressure brake apparatus, and more particularly to the so-called "triple" valve for such apparatus.

The present improvements have for their object to utilize a larger percentage of the actual pressure in the apparatus in applying the brakes than has heretofore been practically possible; and to this end they consist, primarily, in means by which upon the application of the brakes the lesser and greater pressures in the apparatus may be applied successively, or, in other words, by which the train-pipe and auxiliary-reservoir pressures may be separately admitted into the brake-cylinder, the lesser pressure of the train-pipe (due to its reduction in pressure to effect the movement of the valve) to expand into the brake-cylinder, which upon equalizing in the train-pipe and cylinder may be augmented by the greater pressure of the auxiliary reservoir for, for instance, an emergency stop.

The invention contemplates the use of both the train-pipe and auxiliary-reservoir pressures for the application of the brakes, and also contemplates as a subordinate feature the use of the auxiliary-reservoir pressure for a service application.

The improvement consists, essentially, in expanding the lesser pressure of one reservoir, say the train-pipe, into the brake-cylinder, which normally contains a lower pressure, and thereupon on the expansion of said pressure into the brake-cylinder, or by the equalization of the pressures in said reservoir and cylinder, effecting the expansion of the greater pressure of another reservoir, say the auxiliary reservoir, into said brake-cylinder.

From the foregoing it will be understood that upon a reduction of train-pipe pressure to effect the application of the brakes the train-pipe pressure is caused to expand into the brake-cylinder, whereupon the auxiliary-reservoir pressure is allowed to enter the brake-cylinder to raise the pressure therein to the fullest extent. Thus, assuming that the pressure in the train-pipe and auxiliary reservoir is seventy pounds and that upon a reduction of twenty pounds pressure in the train-pipe to effect the application of the brakes communication between the auxiliary reservoir and train-pipe will be cut off, holding the seventy pounds pressure in the auxiliary reservoir, and communication between the train-pipe and brake-cylinder is established, the train-pipe pressure will then expand into the brake-cylinder until such pressure is, say, at forty pounds. The auxiliary-reservoir pressure of seventy pounds will then be caused to expand into the brake-cylinder, so that the brake-cylinder pressure will be increased to the greatest extent, say sixty-two pounds. The lesser pressure, therefore, of the train-pipe has been caused to expand into the brake-cylinder, which may be thereafter immediately augmented by the greater pressure from the auxiliary reservoir.

The particular means for carrying out this improvement may obviously partake of various forms of a valve device or of movable parts having the functions of a valve, and several forms will be hereinafter set forth in order that the scope of the invention may be understood.

Figure 2:
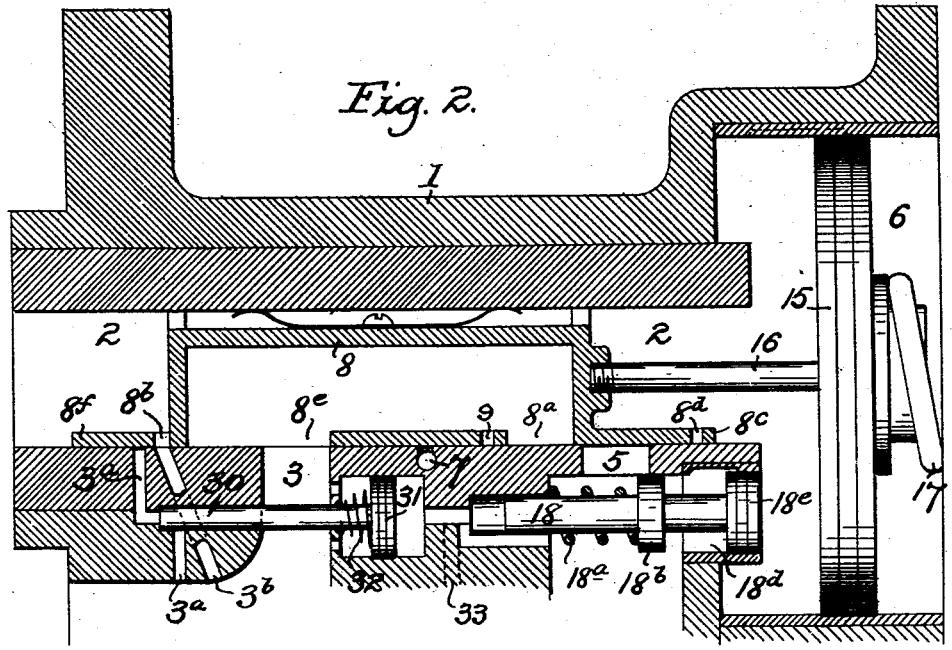
Figure 3:
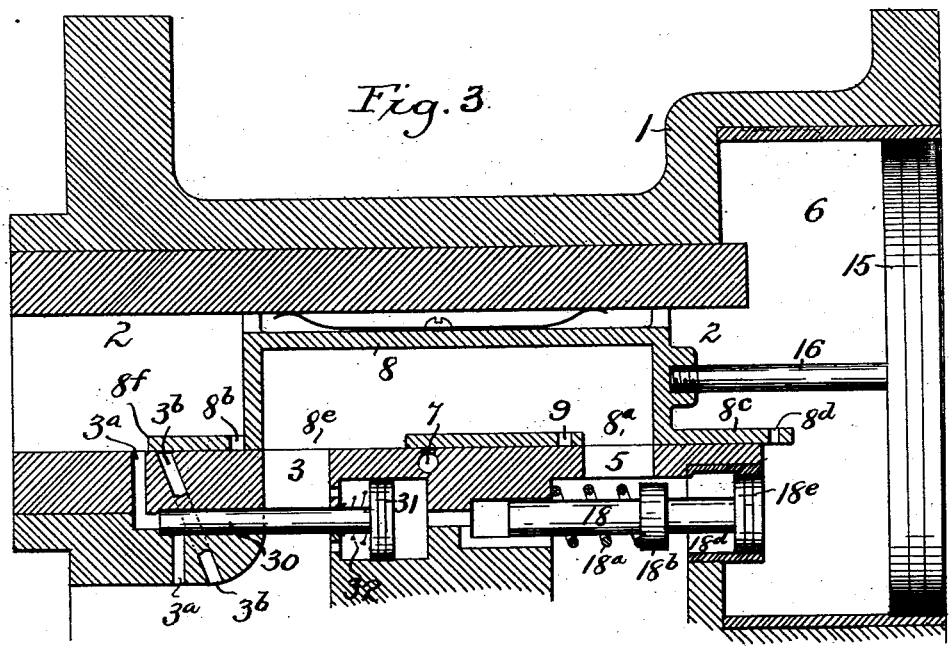
Figure 4:
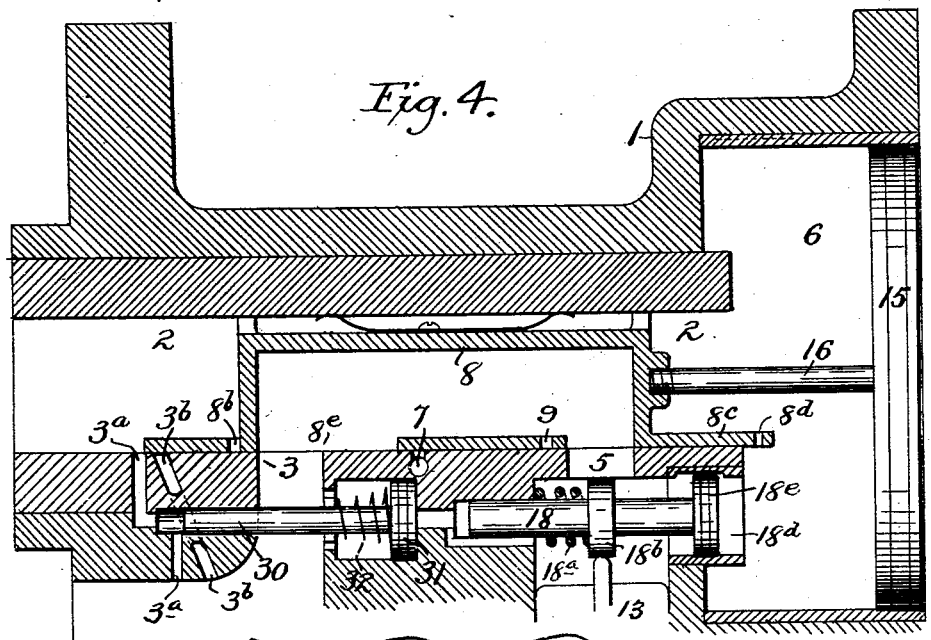
Figure 5:
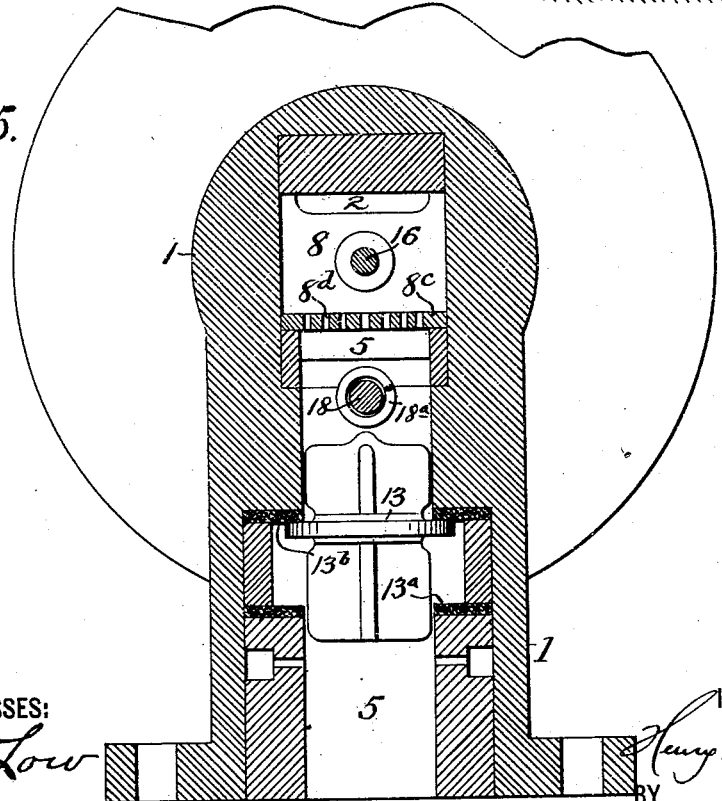
Figure 6:
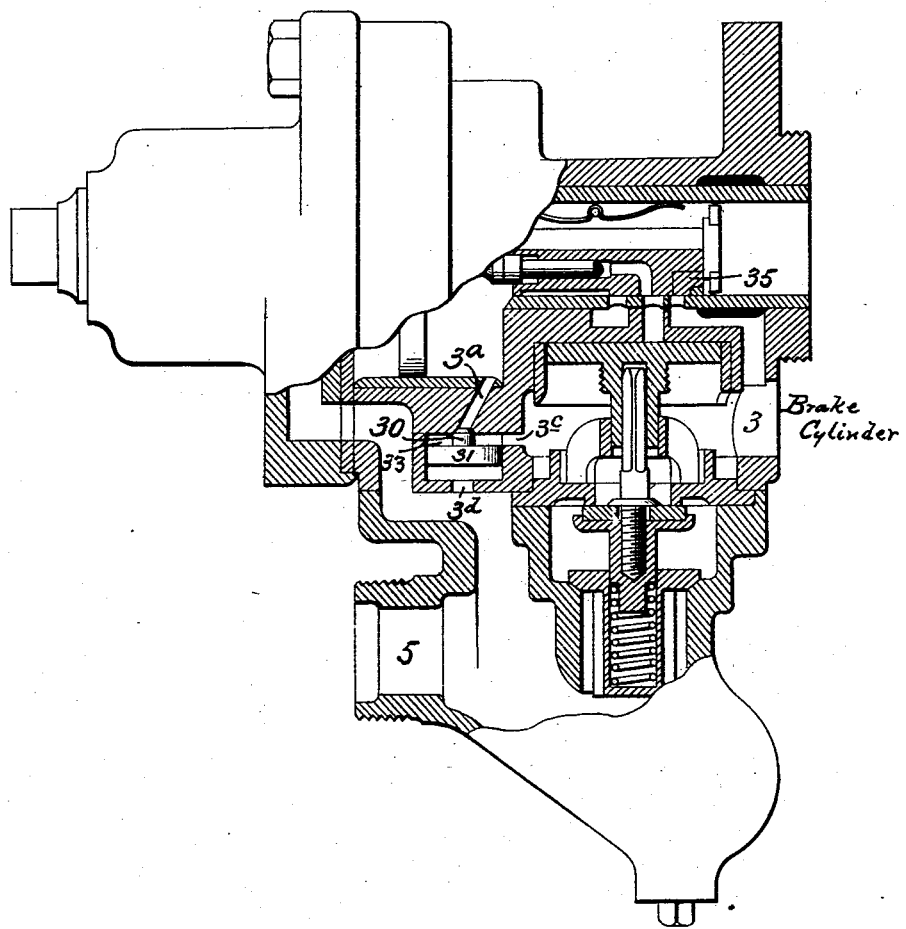
Figure 7:
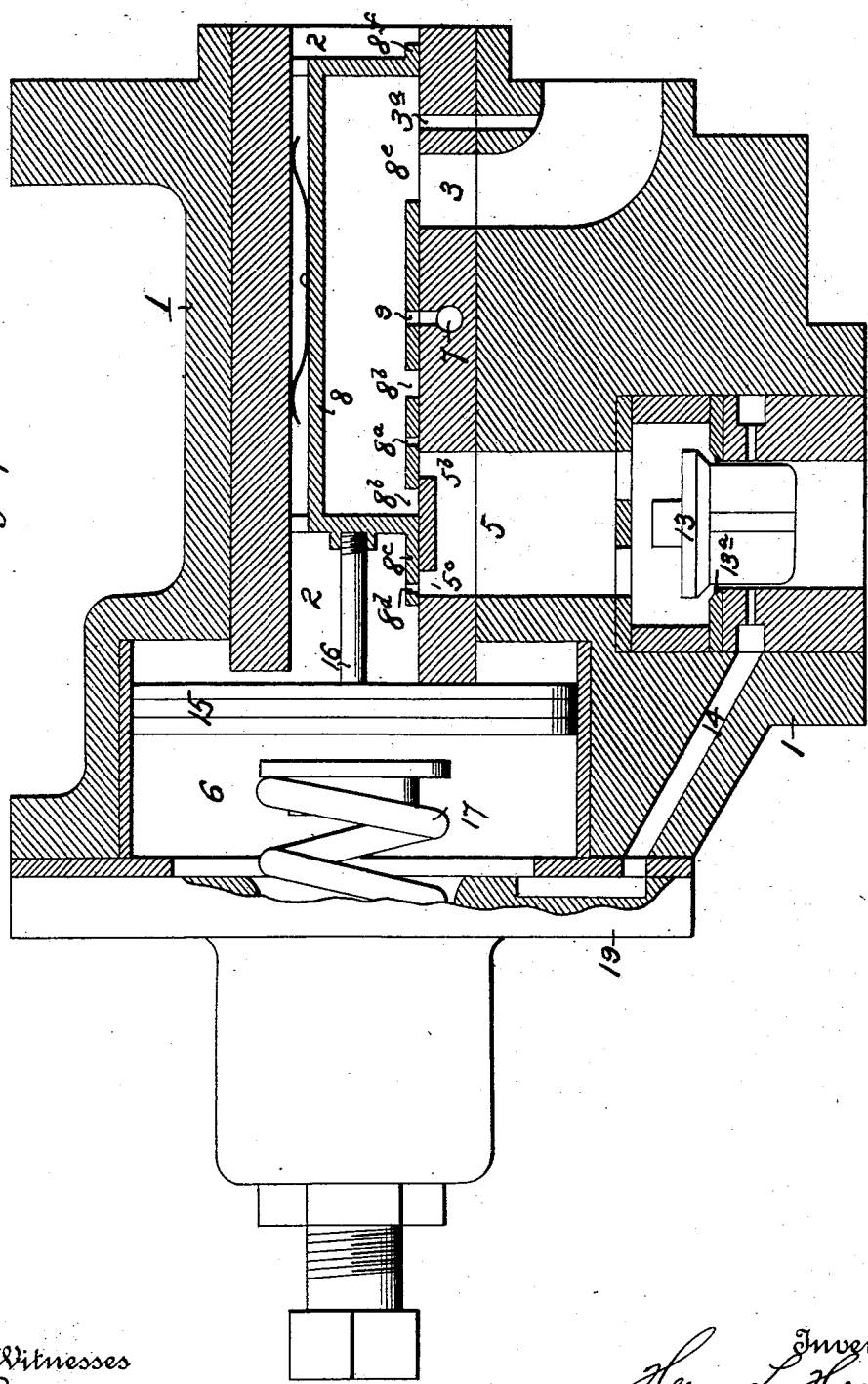
Figure 8:
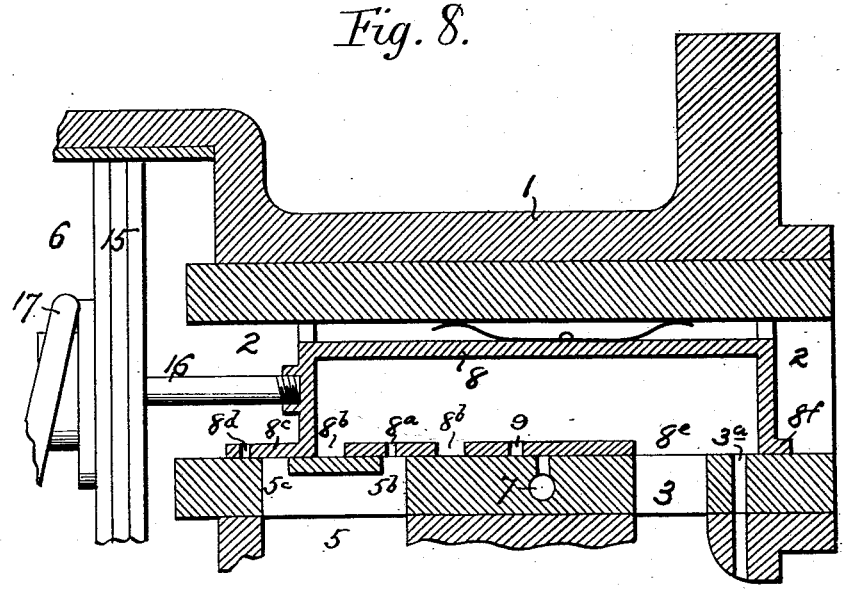
Figure 9:
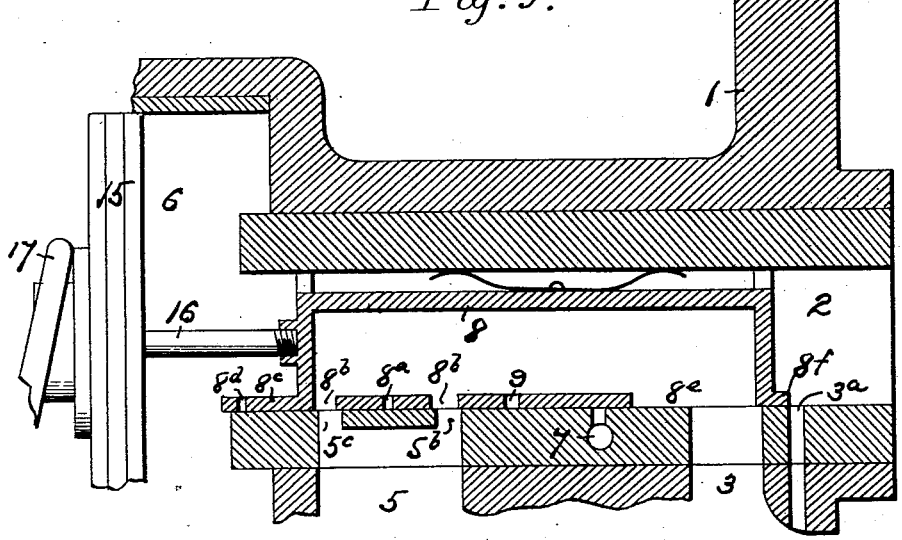

In the accompanying drawings, Figure 1 is a sectional elevation of a valve, its casing and connected train-pipe, auxiliary reservoir, brake-cylinder, and exhaust embodying one form of the invention. Fig. 1ª is a detail of the secondary valve without the spring. Fig. 2 is a similar section showing the valve in one of its moved positions for effecting the service stop. Fig. 3 is a similar section of the valve in another position at the commencement of the emergency stop and before the secondary valve moves. Fig. 4 is a similar section of the valve in emergency-stop position, the secondary valve having moved to open communication between the auxiliary reservoir and the brake-cylinder. Fig. 5 is a cross-section of the valve and casing on the line 5 5 of Fig. 1. Figs. 6 and 7 are modified forms of a valve provided with the invention, and Figs. 8 and 9 are views of the valve of Fig. 7 in changed positions.

Referring now to the construction shown in

Figs. 1, 2, and 3, embodying the preferred form of the invention, the casing 1 of the valve is provided with a valve-chamber 2, communicating at one end with a cylinder 6, that is closed by a cap 19, and at its other end communicates with the auxiliary reservoir. The valve-chamber 2 also communicates with a passage 5, leading to the train-pipe, and also with a passage 3, leading to the brake-cylinder. The valve-chamber also communicates by a passage $3^a$ with the brake-cylinder and with an exhaust-port 7. The valve-chamber contains a valve 8, arranged to control the admission of pressure from the train-pipe to the brake-cylinder through one or more openings and also the exhaust of pressure from the brake-cylinder to the atmosphere. The valve is connected by a stem 16 to a piston 15, arranged in the piston-cylinder 6, the complete movement of which piston and valve being opposed in one direction by a suitable spring 17, preferably supported and carried by the cap 19 in any suitable manner. The inner end of this spring 17, when the valve and piston are in the exhaust or running position, stops short of meeting the piston and allows, as will be hereinafter explained, a slight movement of the valve before the spring may be compressed. The train-pipe passage 5 is provided with seats $13^a$ and $13^b$ for a double check-valve 13, mounted in said passage and arranged to hold the pressure in the brake-cylinder from escaping back to the train-pipe should there be a further reduction of train-pipe pressure while the communication between the train-pipe and brake-cylinder is open, and also to confine the train-pipe pressure to one side of the piston 15 when the pressure is raised to return the valve to running or exhaust position.

The particular form of valve taken for illustration in the present embodiment of the invention is a recessed valve provided with a forward flange $8^c$ and with an intermediate bridge across the recess providing an exhaust-port 9 for coincidence with the passage 7, a port $8^a$ for communication with the train-pipe passage 5, and also providing an opening $8^e$ for coincidence with the brake-cylinder passage 3.

The forward flange $8^c$ of the valve may be provided with a port $8^d$, adapted to coincide with the train-pipe passage 5 to establish communication between the train-pipe and auxiliary reservoir. This latter port $8^d$ may be omitted and a charging-slot be introduced in the piston-cylinder 6 for a similar purpose, as indicated by dotted lines in Fig. 1, and the flange $8^c$ then simply serve to close the train-pipe passage from the valve-chamber 2. The valve side of the piston 15 is exposed to the auxiliary-reservoir pressure in the valve-chamber 2, and on the opposite side of the piston the piston-cylinder 6 is in communication by a passage 14 with the train-pipe passage 5 below the check-valve 13. When the parts are in the position shown in Fig. 1, the brake-cylinder is open to the exhaust-passage 7 through the recess of the valve 8 and the port 9, and the train-pipe is in communication with the auxiliary reservoir either through the port $8^d$ of the valve-flange or through the passage 14, piston-cylinder 6, and charging-slot, (if the latter be used,) and thence by the valve-chamber 2 around the exterior or outer side of the valve, and in this position the auxiliary reservoir may be charged with the desired pressure from the train-pipe.

Although the invention in the main contemplates the use of an emergency stop only, the construction is such that a service stop may be effected if desired. Provision for such stop may be made in various ways. Thus, as shown in Fig. 1, the valve 8 is provided with a rear flange $8^f$, having a service-port $8^b$ therethrough for coincidence with a passage $3^b$, leading to the brake-cylinder. It is to be noticed that when the port $8^b$ and passage $3^b$ are in coincidence, as in Fig. 2, the train-pipe passage 5 is still cut off from the brake-cylinder and from the recess of the valve 8, and also that the exhaust-passage 7 is shut off.

The valve-casing 1 contains a secondary valve 30, consisting of a piston 31 and a stem forming the valve proper that controls the passage $3^a$, leading from the valve-chamber 2 or auxiliary reservoir to the brake-cylinder passage 3. The piston of this valve is exposed on one side to the train-pipe pressure, preferably below the check-valve 13, and on its opposite side to the brake-cylinder passage, and hence to whatever pressure—atmospheric or higher—that may be in said cylinder. The end of the stem of the piston of this secondary valve, being very much smaller in area than its piston 31, may be exposed when closing the passage $3^a$ to the auxiliary-reservoir pressure, as in Fig. $1^a$, or, in lieu thereof, a gentle spring 32, as in Fig. 1, may bear against one side of the piston, tending to move it to open the passage $3^a$. The arrangement of this secondary valve 30 is such that after the pressure from the train-pipe has been admitted to the brake-cylinder, and the pressures in said pipe and cylinder are equal or substantially equal, and hence balanced on both sides of the piston 31, the spring 32 or the auxiliary-reservoir pressure acting on the end of the stem will overbalance the pressure upon the piston 31 and cause it and the stem to move to open the passage $3^a$ to the brake-cylinder and immediately admit the auxiliary-reservoir pressure through said passage to said cylinder to augment that previously admitted from the train-pipe and thus apply the brakes with the greatest force the pressures in the apparatus are capable of imparting. There is also provided a movable abutment, formed by a collar $18^b$, to meet the upper end of the double check-valve 13 to prevent its seating against its upper seat $13^b$ and allow the train-pipe pressure to pass around the check-valve into the brake-cylinder. This abutment is carried by a stem 18 of a piston 18$^c$, working in an open-ended cylinder 18$^d$ in the valve-casing 1, between and communicating with the piston-cylinder 6 on the auxiliary-reservoir side of the piston 15 and the train-pipe passage 5. A spring 18$^a$, surrounding the stem 18, may be used to aid the return of the abutment and piston to normal position, to allow the check-valve 13 to seat against its upper seat should the train-pipe pressure so move it.

Instead of the double check-valve described a single check-valve may be used, seating only against the lower seat 13$^a$, as will hereinafter appear.

If a service stop be desired, and the construction before described be employed, the engineer by the operation of his valve will effect a slight reduction in the train-pipe pressure. This will cause the check-valve 13 to seat on its lower seat and correspondingly reduce the pressure from the piston-cylinder 6 through the passage 14 from one side of the piston 15, so that the excessive or overbalancing auxiliary-reservoir pressure acting upon the opposite side of the piston will effect the movement of the piston and valve from the position shown in Fig. 1 to the position shown in Fig. 2, slightly compressing the spring 17, cutting the brake-cylinder passage 3 off from the exhaust-passage 7, and bringing the service-port 8$^b$ in coincidence with the passage 3$^b$, whereupon the pressure in the auxiliary reservoir will pass into the brake-cylinder through said port 8$^b$ and passage 3, applying the brakes. In this expansion of the auxiliary-reservoir pressure to the brake-cylinder the pressure on that side of the piston 15 will be so far reduced as to permit the spring 17 acting on the other side of said piston as to move it and the valve 8 back to take the service-port 8$^b$ from coincidence with the passage 3$^b$, cutting off further admission to the brake-cylinder and holding that already admitted therein. If the pressure in the train-pipe now be raised slightly, it will raise the check-valve 13 to its upper seat and permit such rise in pressure to pass by passage 14 to exert its force against the piston 15, which, aided by the spring 17, will move the valve 8 back to running position, as in Fig. 1. In the movement of the valve 8 to the service-stop position the train-pipe passage to the brake-cylinder is still cut off by said valve, and as the train-pipe pressure acting on one side of the piston 31 cannot be reduced in effecting the service stop sufficient to allow the pressure on the other side of the piston to establish an equilibrium, no movement of the secondary valve 30 will take place.

If it be desired to effect an emergency stop, the principal object for which this valve is designed, the train-pipe pressure will be reduced, so that the piston 15 and valve 8 will move to the position shown in Fig. 3, compressing the spring 17 to its greatest extent, due to the preponderance of pressure of the auxiliary reservoir upon the opposite side of the piston, cutting off the exhaust from the brake-cylinder and bringing the port 8$^a$ into coincidence with the train-pipe passage 5 for the passage of the train-pipe pressure through the recess of the valve and opening 8$^e$ of the valve 8 into the brake-cylinder. This expansion of the train-pipe pressure into the brake-cylinder will cause an equalization of pressures on both sides of the piston 31 of the secondary valve 30, so that either the pressure of the auxiliary reservoir on the end of said secondary valve or the force of the spring 32, if used, will move the secondary valve to open the passage 3$^a$ and then admit the auxiliary-reservoir pressure into the brake-cylinder to augment that already admitted therein from the train-pipe, thus applying the brakes with the greatest force the pressures in the apparatus are capable of imparting.

When the movable abutment 18$^b$ and double check-valve 13 are used, the reduction in train-pipe pressure to effect the movement of the valve 8 to this emergency-stop position will permit the auxiliary-reservoir pressure, acting on one side of the piston 18$^c$, to immediately move said piston and the abutment 18$^b$, so that the abutment will be in position to obstruct the seating of the double check-valve against its upper seat 13$^b$, and hence allow the unobstructed flow of the train-pipe pressure to the brake-cylinder. When the pressure in the brake-cylinder is augmented by that from the auxiliary reservoir, or as soon as the pressure is about equal on both sides of the check-valve, the check-valve 13 will seat by gravity on its lower seat 13$^a$ to confine such pressure in the brake-cylinder. As soon as the auxiliary-reservoir and brake-cylinder pressures are equal, the piston, with the movable abutment 18$^b$, moves back under the force of the spring 18$^a$ to the normal position, so as not to obstruct the seating of the double check-valve against its upper seat 13$^b$ when the train-pipe pressure is raised sufficient to so move said check-valve. The brakes may now be released by raising the train-pipe pressure so that such pressure will pass through the passage 14 and act upon one side of the piston 15, which, aided by the force of the spring 17, and before such rise in pressure equals that on the auxiliary-reservoir side of said piston, will immediately move the piston 15 and its valve 8, returning the parts to the position shown in Fig. 1, opening the brake-cylinder by opening 8$^e$ and recess of the valve to the exhaust by the coincidence of port 9 and passage 7. In raising the train-pipe pressure for this purpose the check-valve 13 is not lifted from its lower seat, because the auxiliary reservoir and brake-cylinder pressures at that time are equal and exceed on the upper side of the check-valve the required train-pipe pressure below it. When the valve 8 reaches the normal running position, the auxiliary reservoir may be recharged through the port 8$^d$ or the charging-slot in the piston-cylinder 6. When the port 8$^d$ is used for recharging, the train-pipe pressure is raised sufficiently slow as not to seat the double check-valve 13 against its upper seat 13$^b$.

At the time the brake-cylinder pressure exhausts to the atmosphere and the recharging of the auxiliary reservoir takes place the train-pipe pressure, acting on one side of the piston 31, will return the secondary valve 30 to close the passage 3$^a$. It will be noticed that the valve 8 is so constructed that the passage 3$^a$ is closed, as by its flange 8$^f$, on the movement to exhaust position in advance of the opening of the exhaust-passage 7, and hence the remaining pressure in the auxiliary reservoir will be confined therein. This covering of the passage 3$^a$ is not essential, because as soon as the valve 8 moves so that the flange 8$^c$ has covered the train-pipe passage 5 the train-pipe pressure will act upon the piston 31 to move the secondary valve 30 to close said passage 3$^a$.

From the foregoing description it will be seen that in expanding the lesser pressure of the working reservoir, i. e., the train-pipe, into another reservoir, as the brake-cylinder, such expansion effects, through the secondary valve 30 or other equivalent device, the expansion of a greater pressure of another reservoir, such as the auxiliary reservoir, into said cylinder, and that this automatic expansion of the auxiliary-reservoir pressure into the brake-cylinder is effected by the equalization of the pressures on both sides of the piston 31 of said secondary valve. It will also be seen that, while in the old methods of applying the brakes on emergency stop the greater pressure of the auxiliary reservoir was admitted to the brake-cylinder slightly ahead of and also during the subsequent admission of the lesser pressure from the train-pipe, so that the greater pressure tended to retard the lesser, the present method not only effectually separates the admission of the two pressures, but admits the lesser pressure of the train-pipe in advance of the greater pressure from the auxiliary reservoir. In addition to overcoming the retardation of the admission of the lesser pressure, the present method, by admitting the lesser pressure followed by the greater one, permits the lesser pressure to expand to complete equalization in the brake-cylinder and train-pipe before the greater is admitted, and thus renders it possible to obtain a higher pressure in the brake-cylinder than is otherwise possible, and it also provides a much larger opening for the passage of the greater pressure, thereby making the operation more rapid.

When the structure employs the service-port 8$^b$ and passage 3$^b$ to adapt the apparatus for a service stop, the motion of the valve 8 for the emergency application will be so rapid in the port 8$^b$, passing over the passage 3$^b$, that practically no expansion of the auxiliary reservoir into the brake-cylinder will take place at that time. When, however, the structure lacks the service-stop function, and hence omits the port 8$^b$ and passage 3$^b$, no danger of this expansion will be present.

In the modified form shown in Fig. 6 the invention is applied to a well-known form of triple valve with a like function and operation. The secondary valve 30 controls the admission of auxiliary-reservoir pressure, through the passage 3$^a$, chamber 33, and passage 3$^c$, into the passage 3, leading to the brake-cylinder. The piston 31 of said secondary valve is open on one side to the train-pipe passage 5 through the passage 3$^d$, and on its opposite side to the brake-cylinder passage through the passage 3$^c$. The valve 30 in this instance is a simple hub of small area seating against the end of the passage 3$^a$, and is thus exposed to the auxiliary-reservoir pressure from the triple-valve chamber. The construction and operation of the triple valve of this modification remain the same with the exception that the second auxiliary-reservoir admission-port of said valve is omitted or closed by a plug 35. In the position of the ports shown in the drawing the triple valve has moved to emergency position and just before the emergency-piston is moved to admit the train-pressure to the brake-cylinder. After this has been effected, and the pressures on both sides of the piston 31 of the secondary valve are equal, said secondary valve moves to open the auxiliary-reservoir passage 3$^a$ to admit the pressure therefrom to the brake-cylinder, as has been fully hereinbefore described.

In the modified form of the invention shown in Fig. 7, the triple valve performs the entire function of the improvement in a single valve. The recessed valve 8 of this modification is substantially the same as that shown in Fig. 1, with the exception that the service-port 8$^b$ is located in a bridge across the recess for coincidence with the train-pipe passage 5, the valve-chamber lacks the passage 3$^b$, and the passage 3$^a$ to the brake-cylinder is normally in communication with the recess of the valve 8. In addition to the service-port 8$^a$ the bridge of the valve has ports 8$^b$, presenting a larger area of opening, also for coincidence with the passage 5. When the parts are in the position shown, the train-pipe is in communication with the auxiliary reservoir, either through the ports 8$^d$ of the valve-flange 8$^c$ or through the passage 14, piston-cylinder 6, and charging-slot, as indicated by dotted lines in Fig. 1, and before described, and thence, by the valve-chamber 2, around the exterior or outer side of the valve, and in this position the auxiliary reservoir may be charged with the desired pressure from the train-pipe.

If a service stop be desired, the engineer, by the operation of his valve, will effect a slight reduction in the train-pipe pressure.

This will cause the check-valve 13 to seat on its seat 13ª and correspondingly reduce the pressure from the piston-cylinder 6 through the passage 14 from one side of the piston 15, so that the excessive or overbalancing auxiliary-reservoir pressure, acting upon the opposite side of the piston, will effect the movement of the piston and valve from the position shown to the position shown in Fig. 8, slightly compressing the spring 17, cutting the brake-cylinder passage 3 off from the exhaust-passage 7, and bringing the service-port 8ª in coincidence with the train-pipe passage 5, whereupon the pressure in the train-pipe will raise the check-valve 13 from its seat and thence pass into the brake-cylinder through said port 8ª, recess of the valve-opening 8ᶜ, and passage 3 into the brake-cylinder, applying the brakes. This admission of the train-pipe pressure into the brake-cylinder will cause a reduction of pressure in the train-pipe and in the piston-cylinder 6, so that the overbalancing pressure of the auxiliary reservoir upon the other side of the piston will immediately cause a continued movement of the piston and valve in the same direction, now compressing the spring 17 slightly and bringing the service-port 8ª out of coincidence with the train-pipe passage, and will thus hold the pressure that has been admitted from the train-pipe to the brake-cylinder in said brake-cylinder and cut off further admission from the train-pipe.

If it now be desired to increase the pressure in the brake-cylinder, as, for instance, to effect an emergency stop, the train-pipe pressure will be reduced, so that the preponderance of pressure of the auxiliary reservoir upon its side of the piston will move said piston and its valve to the position compressing the spring 17 to a greater extent and bringing the two ports 8ᵇ into coincidence with the train-pipe passage 5 through the ports 5ᵇ 5ᶜ to present a large area of opening for the passage of the train-pipe pressure through the recess of the valve into the brake-cylinder. This admission of the train-pipe pressure into the brake-cylinder will cause a further reduction in the train-pipe pressure and in the piston-cylinder on the train-pipe side of the piston 15, so that the preponderance of the auxiliary-reservoir pressure upon its side of the piston will move the piston and valve in the same direction, further compressing the spring 17 to bring the parts to the position shown in Fig. 9, opening the auxiliary reservoir to the brake-cylinder through the passage 3ª, while still continuing the communication between the train-pipe and brake-cylinder through the recess of the valve, so that the pressure of the auxiliary reservoir may augment the pressure in the brake-cylinder that had previously been admitted and which may then be passing thereto from the train-pipe.

The admission of the auxiliary-reservoir pressure into the brake-cylinder will lower the pressure acting upon its side of the piston 15 to such an extent that if now the train-pipe pressure be raised such pressure will pass by the passage 14 to the piston-cylinder to act upon that side of the piston until just before the train-pipe pressure equals that above the check-valve 13, when the spring 17 will be free to aid such increase of pressure to move the valve back against the pressure in the valve-chamber and auxiliary reservoir toward the release position, and as soon as the ports 8ᵇ move from coincidence with the train-pipe passage, so as to cut off the train-pipe from the brake-cylinder, a material accumulation or rise in the train-pipe pressure may then act to completely return the valve and piston to the normal exhaust or running position. (Shown in Fig. 7.)

It is obvious that instead of depending upon the additional movement of the valve 8 to the position shown in Fig. 9 for admitting the auxiliary-reservoir pressure to the brake-cylinder to supplement that admitted from the train-pipe the secondary valve 30 heretofore described may be employed in this structure, in which case, instead of depending upon the valve-flange 8ᶠ to control the passage 3ª, said secondary valve will control it precisely as before described.

It is to be remarked in passing that all the functions of the structure shown in Figs. 7, 8, and 9 have not been herein set forth, as such valve forms the subject-matter of another application executed by me of even date herewith and filed in the Patent Office April 14, 1893, Serial No. 470,389.

While the movement of the valve to admit the auxiliary-reservoir pressure to the brake-cylinder has been described as taking place upon the equalization of the pressures in the brake-cylinder and train-pipe, it is obvious that advantage may be gained over the old methods if the valve moves to admit the auxiliary reservoir slightly in advance of the actual equalization of pressures, and hence it is to be noted that by the term "equalization" is meant at or near equalization.

No claim is herein made to the specific triple valve herein shown and described, consisting of two valves, one valve controlling the admission of train-pipe pressure to the brake-cylinder and the other valve controlling the admission of auxiliary-reservoir pressure to the brake-cylinder, as the same is claimed in my application, Serial No. 517,036, a division hereof.

What is claimed is—

1. In a brake mechanism, the combination with a casing having ports communicating with train-pipe, brake-cylinder, and auxiliary reservoir, of a valve device controlling such ports and movable first to place the train-pipe and brake-cylinder in communication and maintain such communication until the pressures therein are substantially equalized and movable subsequently to place the auxiliary reservoir and brake-cylinder in communication, substantially as described.

2. The combination with the brake-cylinder, of the train-pipe having a communication therewith, the auxiliary reservoir also having a communication therewith, a movable part operating to open the first-mentioned communication and permit the substantial equalization of pressures in said train-pipe and brake-cylinder, means for cutting off the train-pipe from the brake-cylinder, and means for operating subsequently to the former to open the latter communication, substantially as described.

3. In a brake mechanism, the combination with a casing having ports communicating with train-pipe, brake-cylinder and auxiliary reservoir, of a valve device controlling such ports and movable first to place the train-pipe and brake-cylinder in communication and maintain such communication until the pressures therein are substantially equalized, and movable subsequently to place the auxiliary reservoir and brake-cylinder in communication and again movable upon the raising of train-pipe pressure to close said latter communication, substantially as described.

4. In a brake apparatus, a valve device controlling ports communicating with train-pipe, brake-cylinder and auxiliary reservoir, and means for causing said valve device to first open communication between the train-pipe and brake-cylinder and maintain such communication until the pressures therein are substantially equalized and thereupon causing said valve device to open communication between the auxiliary reservoir and brake-cylinder, substantially as described.

5. In a brake apparatus, the combination with the train-pipe, auxiliary reservoir and brake-cylinder passages of a valve device controlling communication between the train-pipe and brake-cylinder and also between the auxiliary reservoir and brake-cylinder normally holding the communication between the auxiliary reservoir and brake-cylinder closed and only opening such communication after the communication between the train-pipe and brake-cylinder has been opened, whereby the auxiliary-reservoir pressure is held from passing into the brake-cylinder until after pressure from the train-pipe has been admitted to the brake-cylinder, and said valve device also controlling communication between the auxiliary reservoir and brake-cylinder irrespective of the primary communication of the train-pipe with the brake-cylinder.

In witness whereof I have hereunto set my hand in the presence of two witnesses.

HENRY L. HOWE.

Witnesses:
  GEO. H. GRAHAM,
  E. L. TODD.